United States Patent
Albright

[19]

[11] Patent Number: 6,035,519

[45] Date of Patent: Mar. 14, 2000

[54] SYSTEM AND METHOD FOR ORIENTING A THREADED INSERT

[75] Inventor: Clare E. Albright, Roscommon, Mich.

[73] Assignee: Air Way Automation, Inc., Grayling, Mich.

[21] Appl. No.: 09/012,182

[22] Filed: Jan. 22, 1998

[51] Int. Cl.[7] .................................................. B23P 19/00
[52] U.S. Cl. .............................. 29/701; 221/1; 221/172; 221/236; 193/45; 29/821; 29/771
[58] Field of Search .................................... 221/171, 172, 221/173, 278, 198, 1, 298; 29/821, 822, 702, 771, 701

[56] References Cited

U.S. PATENT DOCUMENTS

| | | |
|---|---|---|
| 2,611,911 | 9/1952 | Graham et al. . |
| 2,759,631 | 8/1956 | Ervine ..................................... 221/173 |
| 2,961,080 | 11/1960 | Smith ..................................... 221/173 |
| 2,997,202 | 8/1961 | Madeux . |
| 3,286,881 | 11/1966 | Haberstump . |
| 3,339,799 | 9/1967 | Spisak . |
| 3,367,015 | 2/1968 | Brosene . |
| 3,563,361 | 2/1971 | Piroutek . |
| 4,074,425 | 2/1978 | Hashimoto et al. ...................... 221/171 |
| 4,744,455 | 5/1988 | Dragotta et al. ........................ 221/172 |
| 4,801,043 | 1/1989 | Cindric .................................... 221/173 |
| 4,940,128 | 7/1990 | Fuller . |
| 5,065,898 | 11/1991 | Michalewski et al. .................. 221/171 |
| 5,419,442 | 5/1995 | Wright, Jr. .............................. 221/171 |
| 5,758,798 | 6/1998 | Duffy et al. ............................. 221/173 |
| 5,845,810 | 12/1998 | Laznicka ................................. 221/172 |

FOREIGN PATENT DOCUMENTS 753595 10/1978 U.S.S.R. .

OTHER PUBLICATIONS

Undated Airway Automation drawing pre Jan. 1997.

*Primary Examiner*—S. Thomas Hughes
*Assistant Examiner*—Steven A Blount
*Attorney, Agent, or Firm*—Harness, Dickey & Pierce, P.L.C.

[57] ABSTRACT

A system for ensuring correct orientation of a threaded insert being inserted into a threaded bore of an aluminum workpiece such as an engine block. The system comprises a threaded insert supply, a feeder for transporting inserts dispensed from the insert supply, and an orient subassembly for dispensing the insert supplied from the feeder into a workpiece bore. The orient subassembly dispenses the insert into the workpiece bore in a tang-down orientation if the insert is supplied to the orient subassembly in a tang-down position. The orient subassembly reorients the insert if the insert is supplied to the orient subassembly in a tang-up position before the insert is dispensed into the workpiece bore.

11 Claims, 9 Drawing Sheets

SYSTEM AND METHOD FOR ORIENTING A THREADED INSERT

BACKGROUND OF THE INVENTION

The present invention relates generally to automated component feed systems, and particularly to a system that orients a threaded insert and that ensures proper orientation of the insert before the insert is fitted into a workpiece.

Because it is less expensive and lighter in weight than steel, aluminum is utilized in the manufacture of products such as automotive engine cylinder head blocks and airplane wings. Typically, engine components are fastened to the cylinder head blocks, or wing skins are fastened to the airplane wings, through the insertion of threaded fasteners, such as bolts or screws, within threaded bores formed in the blocks or wings. The structural integrity of an assembled engine, wing, or similar workpiece is thereby directly related to the strength of these threaded connections.

However, the above-described threaded connections do not exhibit the same strength as do threaded connections in steel workpieces. When fasteners are driven into the bores in direct threaded relationship, threaded aluminum bores are more susceptible to being stripped both during workpiece assembly or upon actual workpiece usage. Stripped bores cause the fastener to inadequately secure the components to the workpiece. Such a condition is unacceptable, as maximum structural integrity and performance is required due to the high degree of stress placed on a workpiece at the threaded connections.

In addition, aluminum, although being a more lightweight metal than steel, is more affected by environmental conditions such as thermal cycling. Therefore, threaded bores in aluminum workpieces must be increased in length to compensate for such properties. Increased bore length results in increased workpiece size, increased fastener length, and a corresponding increase in overall workpiece weight. With continuing demand in the automotive industry for higher engine performance in smaller areas of implementation, the increased dimensional requirements represent a significant design limitation.

In response in part to the above, threaded steel inserts are often utilized in the above and other applications to increase the structural integrity of threaded workpiece connections and to minimize workpiece weight and overall dimensions. Typically, oversized threaded bores are formed in the aluminum workpieces. A threaded steel insert is then driven into the bore, via a tang formed at one end thereof, in a friction fit. A fastener engages with the insert rather than the aluminum bore walls as it is driven into the workpiece. The fastener/insert interconnection thereby creates a structurally sound securing of the fastener to the workpiece and eliminates stripping of the bore inner walls by the fastener.

When steel inserts are used in automatic assembly operations, it is essential that the insert be fitted into the bore in a tang-down orientation. If the insert is fitted in a tang-up orientation, insertion of the fastener into the bore is obstructed. Such an obstruction could cause jamming of the supply system and subsequently result in assembly line downtime and added maintenance and repair costs.

Therefore, it would be desirable to provide a threaded insert orient system that ensures that an insert supplied from an automated insert supply system is correctly oriented in a tang-down position before being blown into the bore of a nosepiece receiver for insertion into a workpiece bore, thereby minimizing assembly line downtime.

SUMMARY OF THE INVENTION

To achieve the foregoing, the present invention provides a threaded insert orient system for ensuring inserts to a nosepiece receiver are supplied in a tang-down orientation. The system comprises a threaded insert supply and a threaded insert feeder for transporting an insert dispensed from the insert supply. A threaded insert subassembly dispenses the insert transported from the feeder into a nosepiece receiver. The insert orient subassembly dispenses the insert into the nosepiece receiver in a tang-down orientation if the insert is supplied to the orient block in a tang-down position. The orient subassembly reorients the insert if the insert is supplied to the orient subassembly in a tang-up position before the insert is dispensed into the nosepiece receiver.

Thus, it is an advantage of the present invention to provide a threaded insert orient system that ensures that an insert is oriented in a tang-down position before being blown into a nosepiece receiver for insertion into a workpiece, regardless of the initial orientation of the insert supplied to the nosepiece receiver.

It is another advantage of the present invention to provide a threaded insert orient system that minimizes the possibility of an insert being supplied to a nosepiece receiver in a tang-up position, thereby minimizing the chance of system malfunction due to insert misorientation.

It is also an advantage of the present invention to provide a threaded insert orient system for ensuring correct delivery of an insert for fitting into an aluminum workpiece bore to compensate for undesirable properties of aluminum and to thereby minimize bore length and subsequently workpiece weight and dimensions.

It is a further advantage of the present invention to provide a threaded insert orient system that is fully automated, that requires minimum maintenance and that exhibits ease of installation with existing insert supply systems.

BRIEF DESCRIPTION OF THE DRAWINGS

FIGS. 9A–9C illustrate the operation of the insert orient subassembly of the present invention shown in FIGS.

8A–8D when a threaded insert is dispensed therein in a tang-up position.

DETAILED DESCRIPTION OF THE PREFERRED EMBODIMENTS

The following description of the preferred embodiments is merely exemplary in nature and is no way intended to limit the invention or its application or uses.

Figure 1:
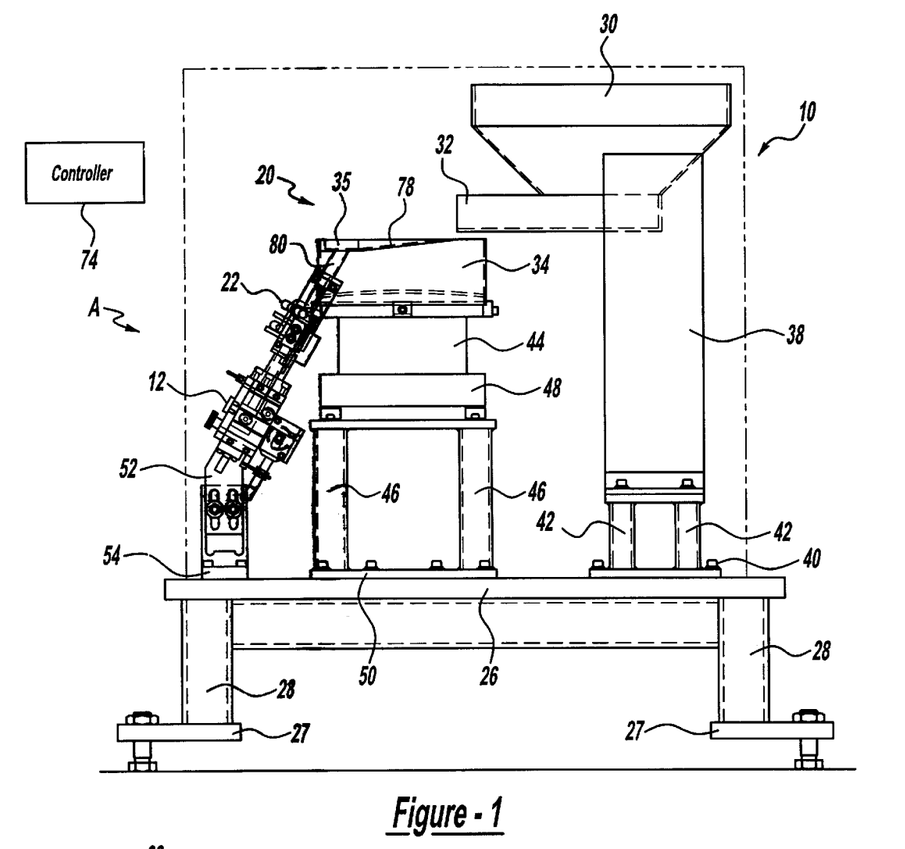
FIG. 1 is a side elevational view of a section of a threaded insert dispense system including an orient subassembly according to a preferred embodiment of the present invention.
Figure 2:
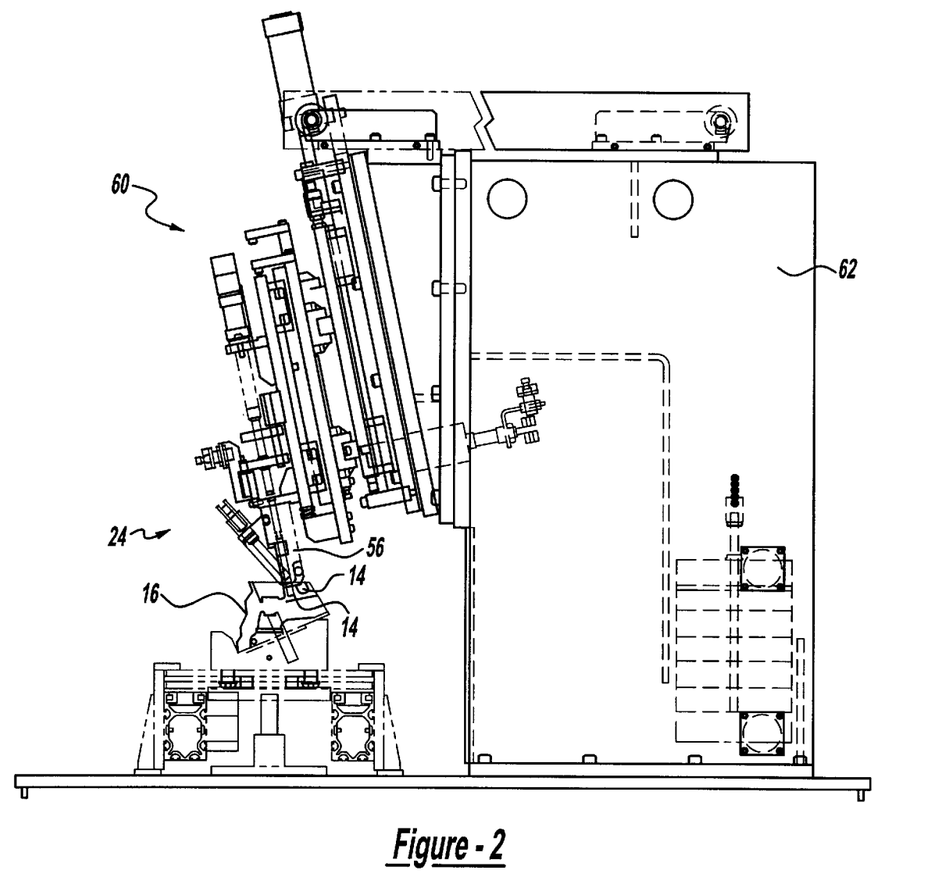
FIG. 2 is a side elevational view of a threaded insert fastener subassembly of the supply system shown in FIG. 1.

Referring to the drawings, FIGS. 1 and 2 illustrate a threaded insert supply system, designed for implementation in a manufacturing facility assembly line environment, generally at 10. The system 10 includes an orient subassembly, shown generally at 12, according to a preferred embodiment of the present invention. The orient subassembly 12 ensures that threaded inserts dispensed through the supply system are correctly oriented before the inserts are threaded into workpiece bores, such as the bores 14 in aluminum engine block 16 (FIG. 2). Absent the orient subassembly 12, the system would dispense such inserts without regard to a specific insert orientation. The orient subassembly 12 thereby minimizes supply system stoppage due to jamming caused by insertion of incorrectly-oriented inserts into workpiece bores.

In addition to the orient subassembly 12, the supply system 10 also includes a coil dispense subassembly 20, a coil feeder subassembly 22, and a coil fastener an insert fastener assembly 24. Each of the system subassemblies is preferably assembled onto a system base, shown at 26 in FIG. 1, which is in turn bolted to a manufacturing facility floor via plates 27 and base supports 28. The insert dispense subassembly 20, which includes an insert supply hopper 30, an insert feeder chute 32, and a vibratory bowl 34 having a corresponding vibratory bowl dispenser 35, is affixed to the base as follows. The supply hopper 30 is bolted to a support beam 38, which in turn is bolted to the base 26 via a mounting plate 40 affixed to beam supports 42. Similarly, the vibratory bowl 34 is mounted on a bowl base 44, which in turn is bolted to bowl base support legs 46 via support plate 48. The bowl base support legs 46 are bolted to the system base 26 via a mounting plate 50.

Referring still to FIG. 1, the feeder subassembly 22 and the orient subassembly 12 are mounted in operative communication with one another on a mounting bracket 52. The mounting bracket 52 is adjustable, thereby allowing adjustment of the two subassemblies relative to one another to align the two subassemblies. The mounting bracket 52 is bolted to the base 26 through a bracket plate 54.

Referring to FIG. 2, the fastener subassembly 24 includes a nosepiece receiver 56, which is mounted to a nosepiece receiver positioning mechanism of the type known in the art and shown generally at 60. The positioning mechanism 60 is mounted to a stationary housing 62 and operates to position the nosepiece receiver in proximity to the workpiece 16. As described in more detail below, the nosepiece receiver inserts positions threaded bores in the workpiece bores 14 to reinforce the bores and to minimize the occurrence of bores being stripped during assembly-line fastening operations.

Although the system support structure described above is that of a preferred embodiment of the present invention, it should be appreciated that variations thereof would not alter the scope of the present invention.

Figures 3A, 3B:
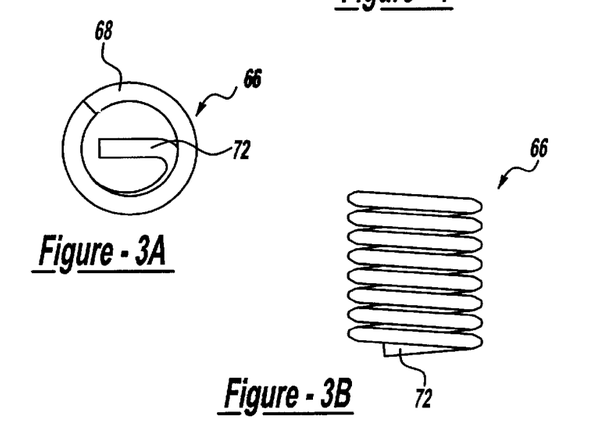
FIGS. 3A–3C are side, top and bottom views of a threaded insert of the type dispensed by the system shown in FIGS. 1 and 2.
Figure 3C:
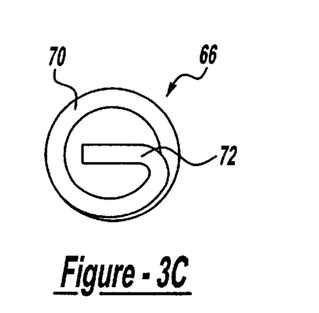

Referring again to the supply subassembly 10 in FIG. 1, the supply hopper 30 holds a large number of threaded inserts to be dispensed through the system 10. As shown in FIGS. 3A–3C, a typical insert is shown generally at 66. The insert is preferably formed from steel in a spring-like configuration. The insert includes an open upper end 68 and an open lower end 70. A tang 72 extends across the open lower end 70 and is utilized to facilitate driving of a threaded fastener to a correct bore depth once the insert 66 is positioned within a workpiece bore, as will be described in greater detail below. Preferably, the inserts are of the type commercially sold under the product name Heli-Coil.

Inserts are dispensed from the supply hopper 30 through the feeder chute 32. Inserts are fed from the feeder chute 32 into the vibratory bowl 34 which is of the type known to those skilled in the art and is preferably constructed according to manufacturing specifications to supply inserts through the bowl dispenser 35 at a specified rate. Preferably, the vibratory bowl 34 is vibrated by an electric motor (not shown) controlled by a system controller indicated generally 74. Preferably, the controller is a programmable logic controller of the type well known in the art that is in communication with various system components through either wire or wireless connections well known in the computing art. However, the controller used may also be a typical personal computer, such as an IBM compatible computer, or any other similar computer capable of being programmed to run a system control program. Upon vibration of the bowl in response to signals from the controller, the inserts fed from the supply hopper travel upwardly around the inner circumference of the bowl into a groove defined by the bowl and shown in phantom at 78. Upon reaching the groove 78, the inserts are channelled out through the bowl dispenser 35 as is known in the art.

The bowl dispenser is in operative communication with the feeder subassembly 22, which includes an escapement 80 spaced apart from the bowl dispenser by a predetermined distance to compensate for change in bowl position due to the characteristic bowl vibration. The escapement 80 receives inserts dispensed from the vibratory bowl and queues a predetermined number of the inserts for dispensing the inserts one at a time to the orient subassembly 12.

Figure 4:
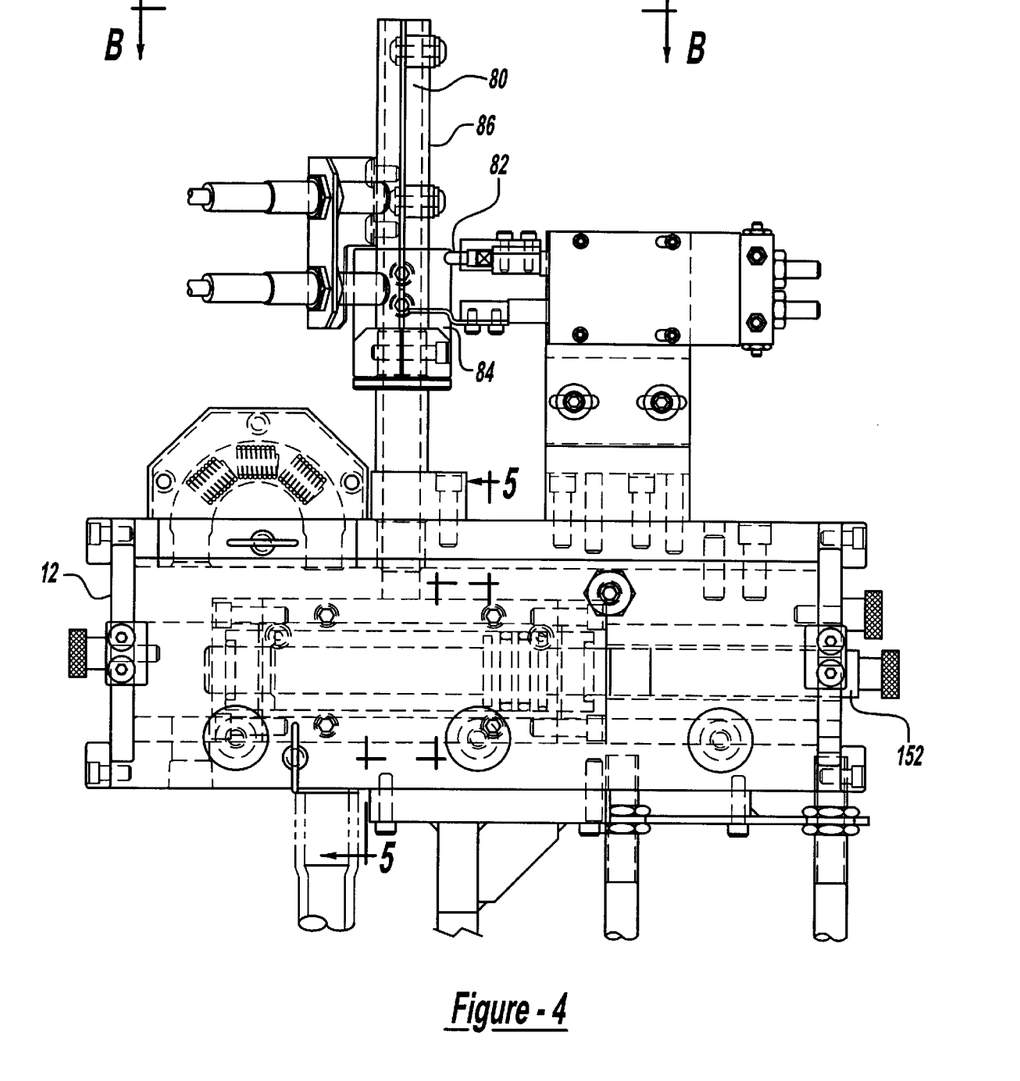
FIG. 4 is a front elevational view of the threaded insert feed and orient subassemblies shown in FIG. 1 as viewed in the direction indicated by arow A.

Referring to FIG. 4, to ensure correct dispensing of inserts, the feeder subassembly 22 includes an actuated detent 82 and an actuated finger 84, both controlled by the system controller 74. A proximity switch 86 is located above the detent for sensing the presence of an insert. The switch 86, upon sensing that an insert is not in proximity thereto, causes the controller to actuate the vibratory bowl, thereby causing additional inserts to be dispensed from the vibratory bowl into the feeder subassembly 22. The switch 86 subsequently deactivates the bowl upon sensing the presence of an insert. The detent 82 is alternately actuated into and recessed from the channel of the feeder subassembly 22 to allow inserts positioned within the escapement 80 to be dispensed below into contact with the finger 84 one at a time, while maintaining a predetermined number of inserts dispensed from the supply hopper between the detent 82 and the switch 86.

When the detent 82 is actuated into the escapement 80, the controller 74 causes the finger 84 to recess. As the finger is recessed, the insert positioned below the detent 82 and held by the finger 84 is dispensed into the orient subassembly 12. Subsequent to the insert being dispensed, the finger 84 is actuated back into the escapement and the detent 82 is again recessed. If the switch 86 does not sense an insert in proximity thereto subsequent to the insert being dispensed into the orient subassembly, the switch 86 signals to the controller to reinitiate vibration of the vibratory bowl until another insert is dispensed into the escapement 80. Once the next insert is dispensed into the escapement and the switch senses its presence and signals to the controller to stop vibration of the vibratory bowl. If the switch senses that an insert still remains in proximity to the switch after the insert is dispensed into the orient subassembly, vibration of the bowl is not initiated.

Thus, the feeder subassembly 22 dispenses inserts into the orient subassembly 12 one at a time in a manner that prevents overfilling of inserts in the feeder subassembly from the vibratory bowl. The feeder assembly thereby minimizes the chance of system downtime due to jamming of the inserts in the feeder subassembly chute by minimizing the chance of adjacent inserts becoming threaded into one another. Such self-threading is caused by the dispensing of too many inserts into the feeder subassembly, thereby causing bowl vibration to be transferred to an insert protruding from the feeder subassembly escapement 80.

Figure 7:
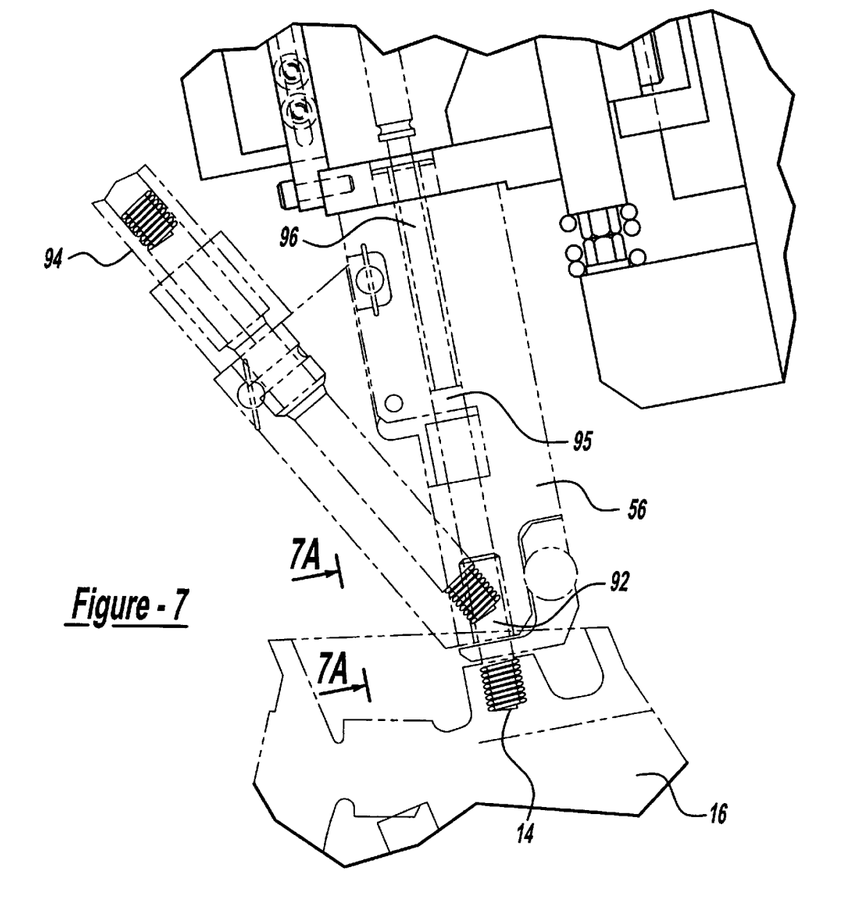
FIG. 7 is an enlarged side view of the insert fastener subassembly nosepiece receiver shown in FIG. 2.
Figure 7A:
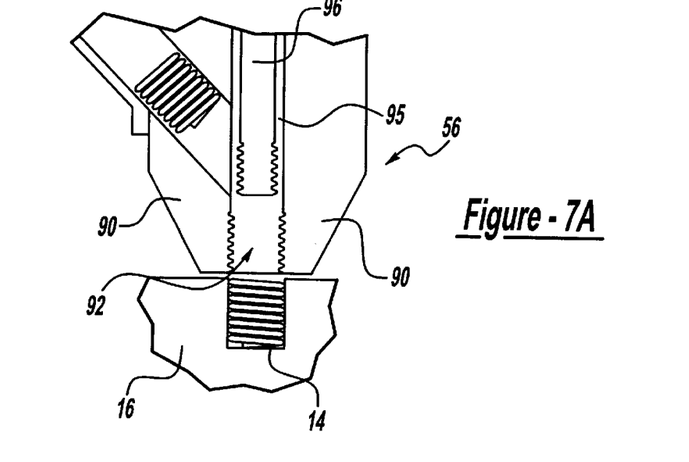
FIG. 7A is a front view of the nosepiece receiver of FIG. 7, with the front housing removed, viewed in the direction indicated by arrow 7A in FIG. 7.

Referring to FIGS. 7 and 7A, the nosepiece receiver 56 is shown in detail. The nosepiece receiver includes cooperating threaded jaws 90 that define a threaded jaw channel 92 for receiving an insert dispensed from the orient subassembly 12 through a nosepiece receiver tube 94. The nosepiece jaws 90 are spring mounted to compensate for nosepiece/workpiece alignment tolerances, thereby facilitating placement of the nosepiece flush with the surface of the workpiece. The jaws are also biased inwardly toward one another in a spring-like manner.

A driver bit 96 is operatively positioned in a nosepiece channel 95 located above the threaded jaw channel 92 and is selectively moved into contact with an insert dispensed therein to thread the insert into the threaded jaw in a manner well known in the art. As the threaded jaw channel is smaller in diameter than the diameter of the insert, the bit threads the insert into the threaded jaw channel and the spring-loaded jaws are subsequently pushed radially outwardly to accommodate placement of the larger diameter insert. After the nosepiece is positioned flush with the surface of the workpiece bore by the nosepiece receiver position mechanism 60, the bit 96 threads the radially compressed insert through the jaw channel and into the workpiece bore 14. As the threaded workpiece bore is also smaller in diameter than the insert, the insert is maintained within the bore through both the threaded interconnection and the outward radial force of the insert against the bore walls.

Figure 8A:
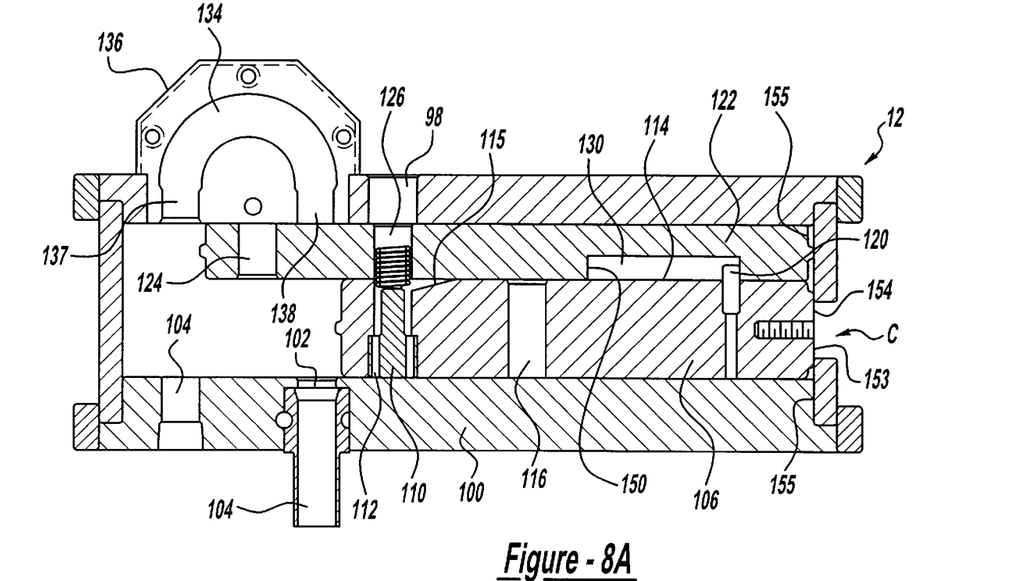
FIGS. 8A–8D are cross-sectional views of the insert orient subassembly taken along line 8—8 in FIG. 5 illustrating operation of the orient subassembly when an insert is dispensed therein in a tang-down position.

Referring to FIGS. 4–6 and 8A, the structure of the orient system of the present invention will now be described in detail. As shown in FIG. 4, the orient subassembly is operatively connected to the feeder subassembly escapement 80. As shown in FIG. 8A, an insert receiver aperture 98 allows passage of an insert from the feeder subassembly 22 into the orient subassembly 12. The orient subassembly also includes a base plate 100 having a dispense aperture 102 in communication with the nosepiece receiver tube 94. The base plate also defines an air port 104 through which air is blown for insert reorient purposes described below in more detail.

Still referring to FIG. 8A, a first plate 106 is slidably located above the base plate 100 and includes an insert receiver post 110 located within a recess 112. The receiver post 110 receives an insert dispensed from the feed subassembly through the receiver aperture 98. The receiver post 110 is shaped to allow a threaded insert dispensed in a tang down orientation to be seated on top thereof, and to allow a threaded insert dispensed in tang up position to drop over the post in a position below a top surface 114 of the first plate 106. Also, the recess 112 defines an angled surface 115 used in connection with insert reorientation as described below. The first plate also includes a second bore 116 that cooper-ates with the dispense aperture 102 in a manner described in detail below. Additionally, a dowel 120 is fixed to the first plate and extends generally upwardly from the top surface 114 to thereby function as a lost motion tab cooperating with a second plate 122, the structure of which will now be defined in detail.

Still referring to FIG. 8A, the second plate 122 is slidably located adjacent the top surface 114 of first plate 106. The second plate 122 includes an air flow bore 124 at one end that cooperates with the recess 112 and the air port 104 for insert reorient purposes described below. The second plate also includes an insert receiving bore 126 that, when the second plate is positioned as shown in FIG. 8A, allows passage of the insert dispensed from the feed subassembly to pass through to the insert receiver post 110. The insert receiving bore 126 also is utilized for insert reorientation purposes as will be described below in more detail. The second plate also includes a lost motion channel 130 that cooperates with the dowel 120 of the first plate to provide the second plate with lost motion relative to the first plate when the first plate is moved from a first position shown in FIG. 8A to a second position shown in FIG. 8D.

The threaded insert orient subassembly also includes an insert reorient tube shown generally at 134. The reorient tube 134 is defined within a housing 136, which is attached to the reorient subassembly 12 as shown. The reorient tube 134 includes an inlet 137 that communicates with the air port 104 and the recess 112, and an outlet end 138 that communicates with the bores 116, 126 of the first and second plates to reorient an insert supplied to the reorient subassembly 12 in a tang-up position as described in detail below.

Figure 6:
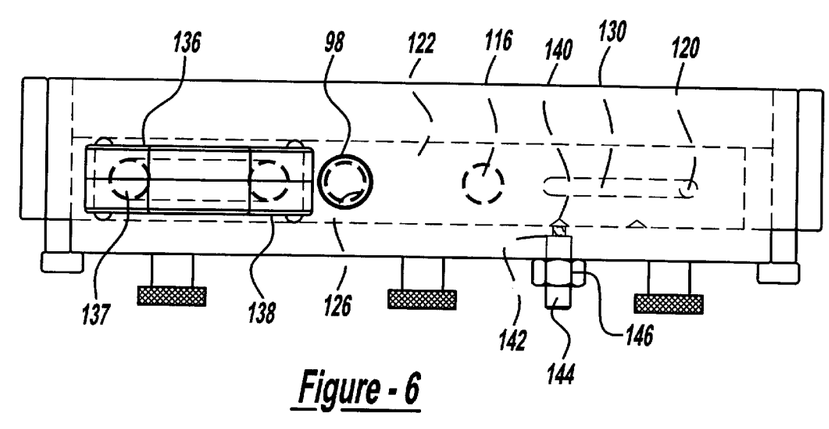
FIG. 6 is a top plan view of the insert orient subassembly, with the subassembly housing removed, as viewed in the direction of arrow B in FIG. 4.

Further, referring to FIG. 6, the second plate 122 includes a groove shown in phantom at 140. A ball bearing 142 is urged into the groove by a bolt 144 affixed in position on the side of the second plate by a conventional hexagonal threaded nut 146. The bolt 144, by urging the ball bearing 142 into the groove 140, prevents sliding of the second plate resulting from frictional engagement with the first plate, as the first plate is moved along the surface of the base plate. The second plate is thus movable only in response to the dowel 120 for engagement with an inner wall 150 of the second plate lost motion channel 130.

Figure 5:
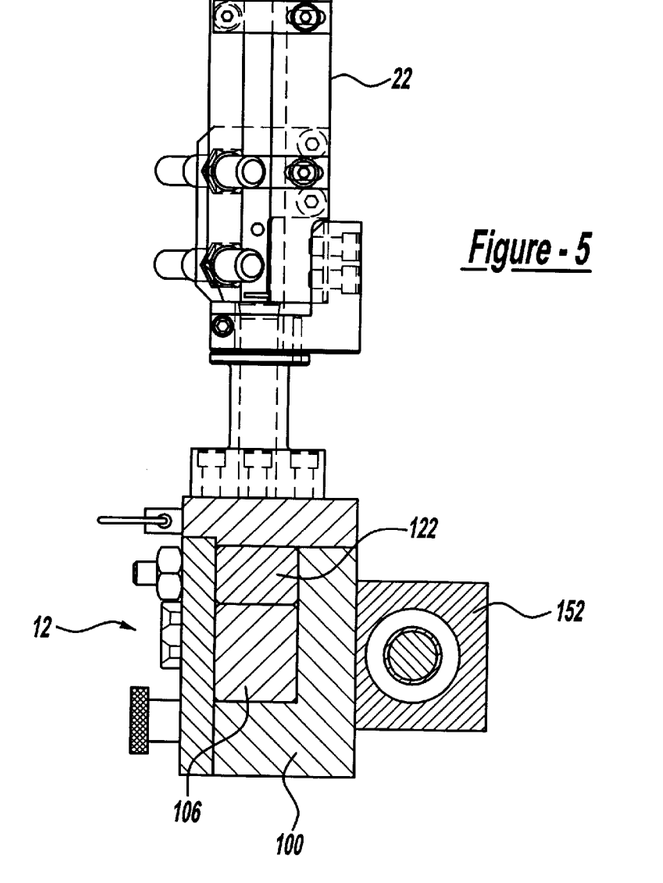
FIG. 5 is a cross-sectional view of the threaded insert orient subassembly taken along section line 5—5 in FIG. 4.

Thus, as shown in FIG. 5, the base plate 100, the first plate 106 and the second plate 122 are all in slidable communication with one another. An actuated cylinder 152 is mounted to the orient subassembly 12 and is connected to the first plate 106. The cylinder is operatively controlled by the controller 74 to selectively move the first plate from a first position, as shown in FIG. 8A, to a second position, as shown in FIG. 8D, to eject the insert from the orient subassembly 12 if the insert is dispensed into the subassembly in a tang-down position, or, if the insert is dispensed into the subassembly in a tang-up position, to reorient the insert to a tang-down position before the insert is ejected, as will now be described in detail.

Figure 8B:
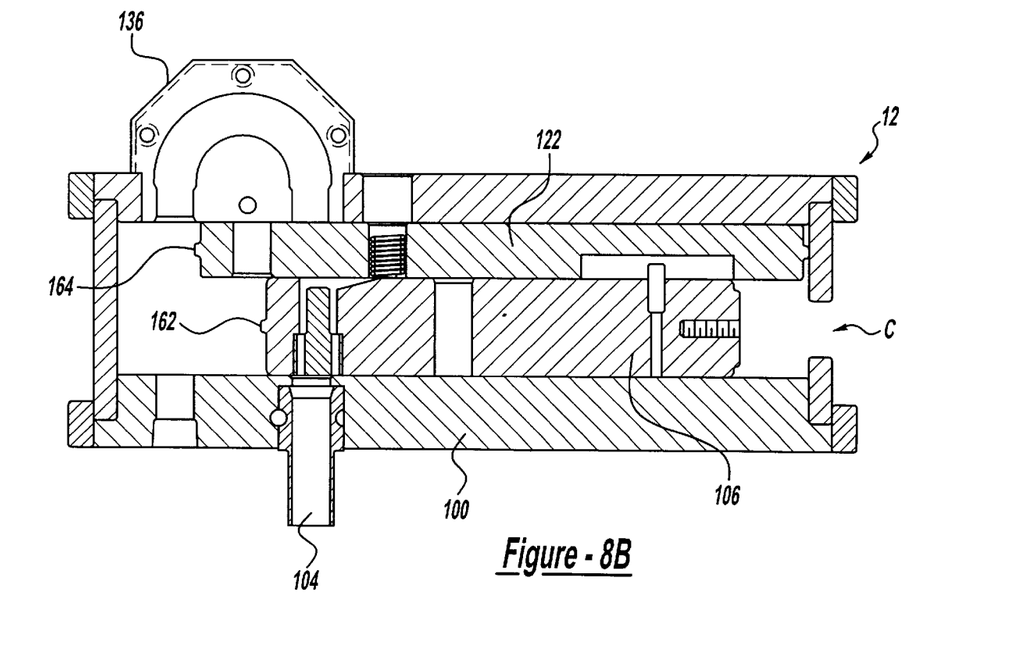

Referring now to FIGS. 8A–8D and 9A–9C, operation of the orient subassembly of the present invention will now be described. Referring to FIG. 8A, a threaded insert is dispensed from the feeder subassembly 22 as shown. Initially, inner edges 153, 154 of the first and second plates 106, 122 are positioned to abut a subassembly housing inner wall 155 such that the recess 112 and the receiving bore 126 are aligned with the receiver aperture 98 to form a single continuous passageway. This passageway allows the insert to be dispensed onto the insert receiver post 110 as shown. After a programmable system delay of, for example, 1–2 seconds, implemented at the controller, the controller actuates the cylinder 152 to move the first plate 106 toward the side of the orient subassembly 12 containing the reorient tube 134 as indicated by direction arrow C. As the first plate is moved from its initial position toward the reorient tube, the lost motion tab 111 moves within the lost motion channel 130 of the second plate 122. Due to the bearing 142 biased in the groove 140, the second plate remains stationary as the first plate is initially moved toward the end of the subassembly containing the reorient tube. Referring to FIG. 8B, because the first plate continues to move in the direction indicated by arrow C, the lost motion tab 111 contacts the inner wall 150 of the lost motion channel 130. The tab thereby causes the second plate to move in the direction indicated by direction arrow C along with the first plate, after the first plate has moved a predetermined distance dictated by the length of the lost motion channel 130.

Figure 8C:
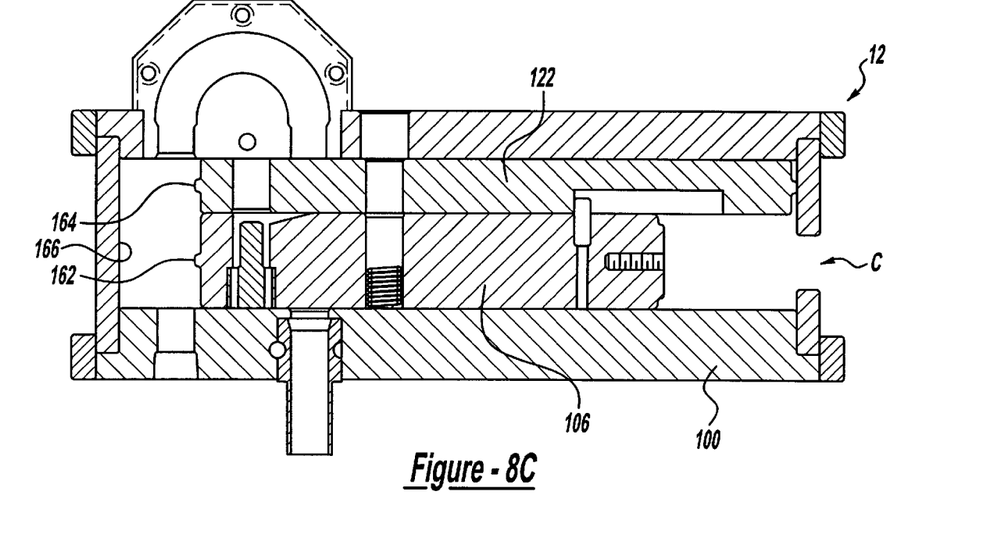
Figure 8D:
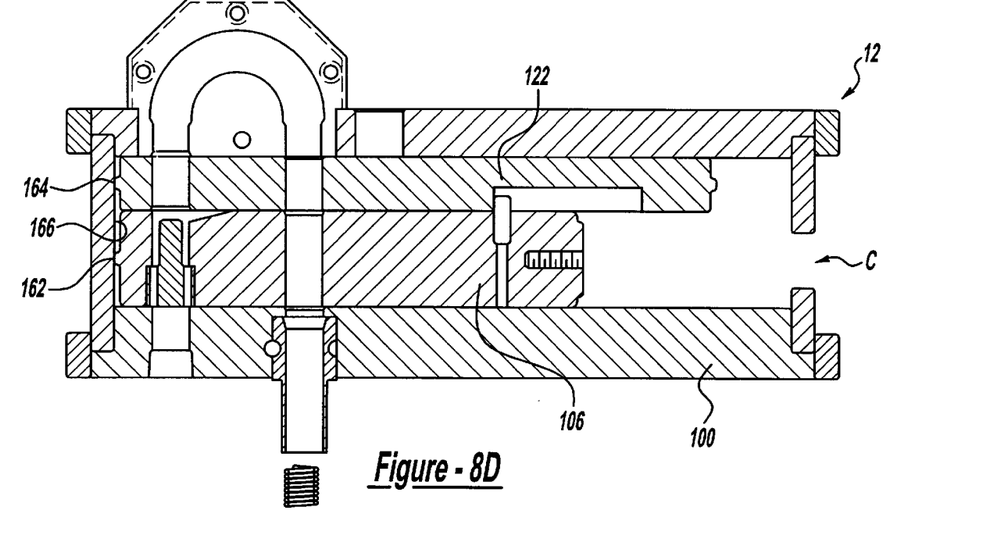

Referring to FIG. 8C, the actuated cylinder 152 thus subsequently moves both the first and the second plates in the direction indicated by arrow C until edges 162, 164 of the first and second plates 106, 122 abut an inner wall 166 of the housing on the side corresponding to the location of the reorient tube 134 as shown in FIG. 8D. In this position, the air port 104, the insert recess 112, the second plate bore 124 and the inlet 137 of the reorient tube 134 are aligned. In addition, the insert dispense aperture 102, the first plate insert reorient bore 116 and the second plate insert reorient bore 126 are also aligned with the outlet end 138 of the reorient tube. Air blown through the air port 104 carries the insert through the passageway created therefrom to effectively reorient the insert from a tang-up position to a tang-down position before it is ejected into the tube 94. After a predetermined time delay, the controller 74 causes the bearing cylinder 152 to return the first and second plates to their initial position as shown in FIG. 8A to receive the next coil.

Figure 9A:
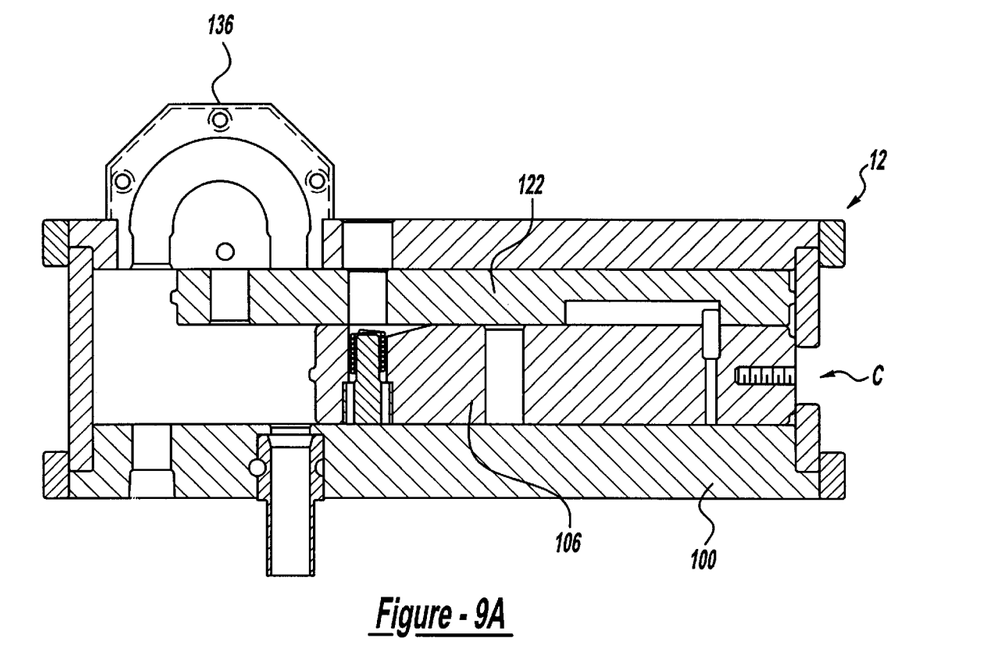
Figure 9B:
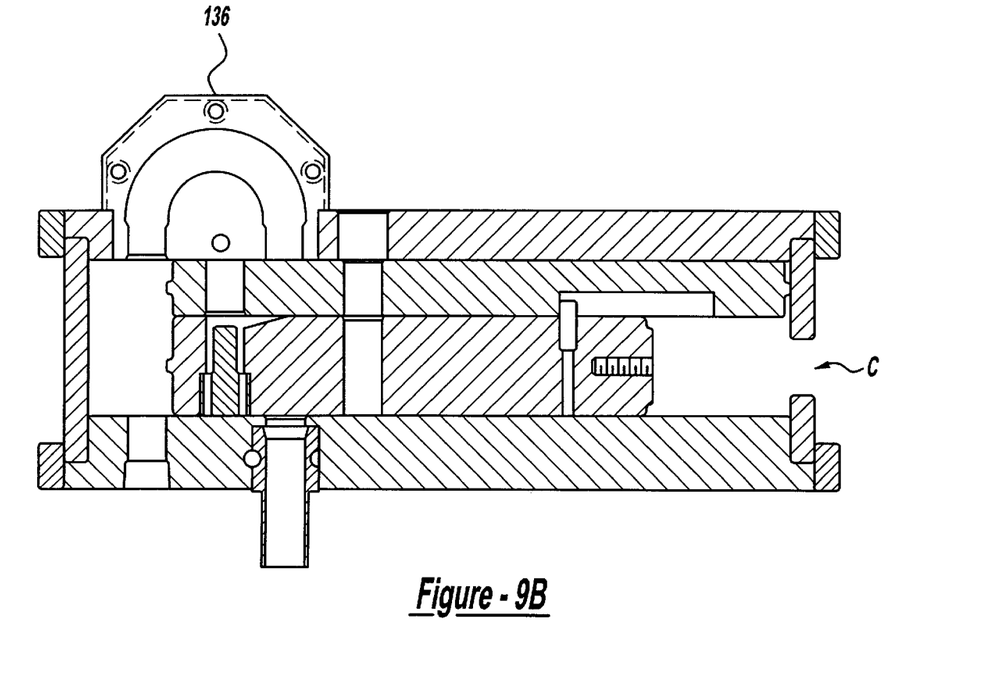
Figure 9C:
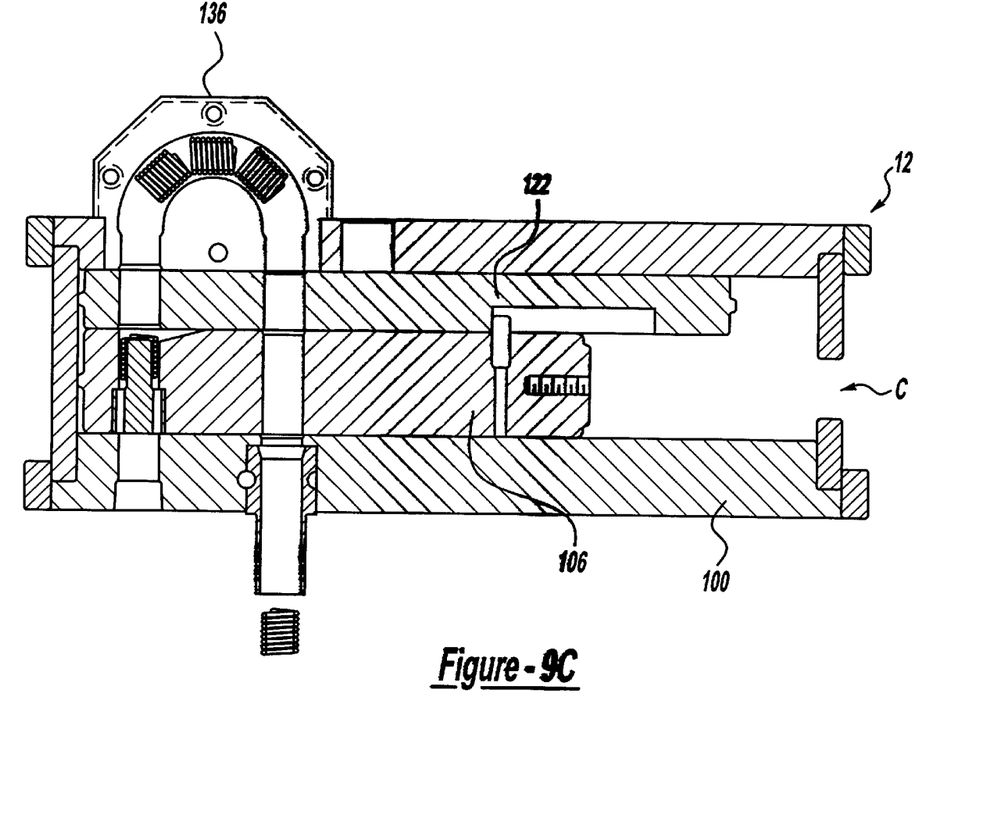

Referring to FIGS. 9A–9C, operation of the threaded insert orient subassembly 12 will now be described when an insert is dispensed into the subassembly in a tang-down orientation. As shown in FIG. 9A, a threaded insert is dispensed from the feeder tube subassembly 22 in a tang-down position through the receiver aperture 98 and onto the receiver post 110 as described above with reference to FIG. 8A. Because the insert is dispensed in a proper tang/down orientation, the insert does not fit over the post, but rather sits atop the post as shown in FIG. 9A. Subsequently, as the actuated cylinder 152 slides the first plate 106 in the direction indicated by arrow C, the insert rides up on the first plate angled surface 115 and subsequently becomes fully dispensed within the second plate bore 126 as shown in FIG. 9B. As the lost motion tab 120 contacts the inner wall 150 of the lost motion channel 130, the bores 116, 126 become aligned, and the insert subsequently drops into the bore 126 as the first and second plates slide together in a direction indicated by arrow C. The insert is thus transported to the insert dispense aperture 102. Subsequent to the first and second plate wall edges 162, 164 abutting the housing inner wall 166, the bores becoming aligned as described above in reference to FIGS. 8A–8D. The insert is then ejected through the threaded jaw channel 92 and the nosepiece receiver tube 94 to the nosepiece receiver 56 and is transported through the tube 94 with assistance from air blown through the air port 104.

It should be appreciated at this point that the orient subassembly 12 can be utilized to reorient any type of part having one end different in structure than its other end and in which it is crucial that the part be correctly oriented before insertion into a product being assembled. It should also be appreciated that the bores in the first and second plates, and the diameter of the insert reorient tube, may be formed in accordance with the size of a particular component for a particular application.

From the foregoing description, it should be appreciated that the insert orient subassembly according to the present invention ensures proper orientation of an insert in an insert supply system before the insert is actually positioned into a workpiece being assembled. The orient subassembly thereby minimizes the assembly system downtime caused by jamming of the system through too many inserts being dispensed into the feed subassembly and threading to one another. The coil subassembly of the present invention also minimizes system downtime due to dispensing of an insert into a workpiece bore in a tang-up position, thereby ensuring the structural integrity and quality of the assembled workpiece.

While the above description constitutes the preferred embodiments of the present invention, it should be appreciated that the present invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A part supply system, comprising:
   a part dispenser;
   a feeder for transporting a part having a first end and a second end dispensed from said part dispenser;
   an orient subassembly for correctly orienting said part supplied from said part feeder for insertion into a workpiece bore; and
   a nosepiece receiver for positioning a part supplied from said orient subassembly for insertion into said workpiece bore;
   said orient subassembly dispensing said part into said nosepiece receiver in a first end-down orientation if said part is supplied to said coil orient block in a first end-down orientation;
   said orient subassembly reorienting said part to a first end-down orientation if said part is supplied to said orient subassembly in a second end-down position before said part is dispensed into said nosepiece receiver;
   a controller for regulating dispensing of parts from said part dispenser and for controlling operation of said orient subassembly;
   said orient subassembly including:
   a base plate having a part exit aperture;
   a first plate slidably engaged with said base plate and having a plurality of bores therein for cooperating with said part exit aperture;
   a second plate in slidable relation with said first plate and having a plurality of bores each cooperating with one of said plurality of bores of said first plate;
   said first and second plates including lost motion means such that when said first plate is moved from a first position to a second position, said second plate moves correspondingly after said first plate has travelled a predetermined distance; and
   a repositioning device cooperative with said first and second plates after said first plate is moved from said first position to said second position for reorienting said part in a first end-down position when said part is dispensed into said orient subassembly in a second end-down position.

2. The part supply system of claim 1, wherein said second plate defines a detent having a ball bearing located therein, said ball bearing being urged into frictional contact with said detent to prevent said second plate from sliding with said first plate due to frictional engagement with said first plate as said first plate is initially moved from said first position toward said second position, said bearing further permitting movement of said second plate via said lost motion means.

3. The part supply system of claim 1, wherein said part repositioning device comprises a semicircular tube in communication with a fan for repositioning said part if said part is dispensed into said orient subassembly in a second end-down position, said fan blowing said part subsequent to said first plate being moved to said second position, through said semicircular tube and into cooperating bores in said first and second plates in a tang-down position.

4. The part supply system of claim 1, wherein said part feeder further comprises a part passage regulator.

5. The part supply system of claim 4, wherein said part passage regulator comprises:

a detent actuated by said controller to retain a predetermined number of parts in said part feeder subsequent to said parts being dispensed from said part dispenser;

a switch located above said detent for signalling to said controller that said predetermined number of said parts is present in said part feeder to limit the number of said parts dispensed into said part feeder; and a finger actuated by said controller and implemented below said detent, said finger retaining said predetermined number of parts in said part feeder when said detent is recessed, said finger being recessed to dispense one of said predetermined number of parts when said detent is actuated.

6. The part supply system of claim 1, further comprising a cylinder operatively connected to said first plate and controlled by said controller for selectively sliding said first plate relative to said base plate.

7. The part supply system of claim 1, wherein said part feeder is spaced from said part dispenser by a predetermined distance to isolate said part feeder from vibrations produced by said part dispenser.

8. The part supply system of claim 1, wherein said part dispenser comprises a vibratory bowl.

9. The part supply system of claim 1, wherein said first plate further defines a part receiver for initially receiving said part dispensed from said part dispenser.

10. The part supply system of claim 9, wherein said part receiver comprises a post recessed from a top surface of said first plate.

11. The part supply system of claim 1, wherein said part comprises an elongated wound coil having a first open end and a second end including a tang.

* * * * *